United States Patent [19]

Chmelir

[11] Patent Number: 4,929,717
[45] Date of Patent: May 29, 1990

[54] METHOD OF PREPARING POLYMERS WITH A LOW RESIDUAL CONTENT OF MONOMERS

[75] Inventor: Miroslav Chmelir, Krefeld, Fed. Rep. of Germany

[73] Assignee: Chemische Fabrik Stockhausen GmbH, Krefeld, Fed. Rep. of Germany

[21] Appl. No.: 222,434

[22] Filed: Jul. 21, 1988

[30] Foreign Application Priority Data

Jul. 25, 1987 [DE] Fed. Rep. of Germany ....... 3724709

[51] Int. Cl.$^5$ ............................................. C08F 6/10
[52] U.S. Cl. .................................... 528/490; 528/492; 525/374; 525/377; 525/380; 526/303.1; 526/317.1
[58] Field of Search ................... 525/380, 329.4, 329.7, 525/374, 377; 528/492, 490

[56] References Cited

U.S. PATENT DOCUMENTS

| | | | |
|---|---|---|---|
| 3,755,280 | 8/1973 | Saunders | 528/487 |
| 4,242,500 | 12/1980 | Franceschini | 528/492 |
| 4,251,412 | 2/1981 | Ferrini | 528/492 |
| 4,375,529 | 3/1983 | Fong | 526/240 |
| 4,414,063 | 11/1983 | Smiley | 528/496 |
| 4,529,753 | 7/1985 | Taylor | 523/328 |
| 4,587,306 | 5/1986 | Vio et al. | 525/380 |

Primary Examiner—Joseph L. Schofer
Assistant Examiner—T. McDonald, Jr.
Attorney, Agent, or Firm—Sprung, Horn, Kramer & Woods

[57] ABSTRACT

The invention concerns a method of preparing homopolymers or copolymers that are water-soluble or swell up in water and have a low residual monomer content by treating them with at least one compound that can react with the monomer's double bond. The homopolymer or copolymer in the swollen form and in the form of a gel or in the form of a solution is treated with a compound, such as for example ammonia, an ammonium salt, an alkylamine and/or one of their salts or a hydroxylamine and/or their salts, that can react with the monomer's double bond and contains nitrogen or with a compound, such as a hydrogen halide, an acetoacetate, or a malonate, that contains an active hydrogen atom, or with a compound, such as bromosuccinimide, pyridinium bromide, or dioxane perbromide, that contains bromine and allows bromine to attach to the double bond, or with a compound, such as a permanganate, a bichromate, a chromate, selenium dioxide, or ozone, that can oxidize the double bond, or with a compound, such as an alkali sulfite or ammonium sulfite, an alkali or ammonium hydrogen sulfite or disulfite, or a thio compound, that contains sulphur, subsequent to which the resulting polymer gel or polymer solution is dried at an elevated temperature.

13 Claims, No Drawings

METHOD OF PREPARING POLYMERS WITH A LOW RESIDUAL CONTENT OF MONOMERS

BACKGROUND OF THE INVENTION

The invention relates to a method of preparing polymers with a low residual content of monomers.

In preparing low molecular-weight water-soluble and high molecular-weight polymers and copolymers that are water-soluble or swell up in water (partly crosslinked) it has been discovered that complete conversion of the monomers, especially monomers based on acrylic acid, is impossible. Residual contents of at least 0.5 and even 1.0% or more of free monomers are often found in polymers manufactured on an industrial scale.

Since the residual monomers are known to be toxic, a method of preparing polymers and copolymers that contain practically no monomers would be very useful. Since it has been impossible up to now to carry out polymerization in such a way as to leave no residual monomers, attempts have been made to remove the toxic residue by converting it into safe derivatives. In German Application No. 1 070 377 and U.S. Pat. No. 2,960,486, for example, aqueous solutions of high molecular weight acrylamide polymers are mixed with a solution of sodium sulfite and dried at 80° to 120° C. to reduce the residual content of monomers to 0.01% by weight. This approach, however, depends on processing the polymer in a very dilute (2–3%) polymer solution, which is uneconomical, and the methods have hardly been used in practice.

The monomers are directly eliminated from a polyacrylamide gel in accordance with U.S. Pat. No. 4,132,844 by heating it to 80° to 150° C. and in accordance with Japanese Patent Nos. 53/51289 and 50/136382 by extraction with methanol or with methanol and water, resulting in residual monomer contents of up to 0.04% by weight.

Homopolymers and copolymers of acrylamide are usually prepared today in an aqueous medium, with the polymer present either in the form of a suspension of water in oil or in that of a polymer gel with a specific residual content of free monomers. Treating a polymer gel with an aqueous solution of sodium bisulfite is described in U.S. Pat. No. 3,755,280, and with a solid alkali sulfite in European Patent No. 0 175 554, leaving residual monomer contents of 0.03 to 0.3% by weight. Japanese Patent No. 56/103207 uses bisulfites, sulfites, and pyrosulfites for the same purpose, Even sulphurdioxide gas has been utilized to reduce the concentration of acrylamide in an emulsion polymer (U.S. Pat. No. 3,780,006).

Although the methods previously described herein do reduce the residual monomer content considerably, they have certain drawbacks, such as for example unpleasant odors due to the release of sulphur dioxide and corrosion of the plant by sulphur dioxide derivatives (e.g. sulphurous and sulfuric acids and their salts in an acidic medium).

Other methods of decreasing the residual monomer content are described with reference to the oil-in-water emulsion polymerization of the water-insoluble polymers. The residual monomer content of polybutadiene-and-styrene latex is reduced in U.S. Pat. No. 4,529,753 by adding tert-butyl-hydroperoxide and sodium metabisulfite. The residual content of ethyl acrylate is reduced from 0.43 to 0.065% by weight in Japanese Patent No. 55/151015 and German Patent No. 2 919 096 by adding ethanolamine. The monomer is removed by steam distillation in European Patent No. 002 860 and CS Patent No. 210 100 and azeotropically in U.S. Pat. No. 4,414,063. Even high-energy radiation (105 Mrad) has been exploited to reduce the residual monomer content in the manufacture of contact lenses from siloxane polymers (GB Pat. No. 2 113 694) or of polyvinyl chloride (U.S. Pat. No. 4,585,808).

The removal of residual monomers to 0.4% by weight of a polymer emulsion by catalytic hydration is described in U.S. Pat. No. 4,375,529.

OBJECT OF THE INVENTION

The object of the invention is to decrease the residual monomer content of homopolymers or copolymers that are water-soluble or swell up in water in an economical way.

This object is attained in accordance with Examples 1 and 8.

The residual monomer content is removed in accordance with the invention as part of a conventional polymerization that usually results in conversions of up to 98 to 99% by subsequently treating the polymer with a compound that reacts with the monomer's double bond to covert the substance into a safe, saturated compound.

A. The polymer gel (or solution in the case of low and medium molecular-weight products) that results from the polymerization is contacted with a solution of a compound that can react with the monomer's double bond, preferably by spraying the gel with the solution but even by simply mixing the solution with the polymer solution. The compound that can react with the monomer's double bond can, however, be added in the form of a solid to the gel or polymer solution. The polymer gel or solution is then treated at an elevated temperature of 50° to 150° C. and preferably of 80° to 120° C., at which the polymer gel becomes partly or completely dry and the polymer solution can thicken or be recirculated to maintain its original concentration. The treatment lasts 10 to 180 and preferably 20 to 120 minutes.

B. In a second variant the residual monomer content can be decreased subsequently in the already partly or completely dry powdered product without resort to the extraction that is state of the art and that must usually be carried out with an organic solvent. In this second embodiment the powdered polymer with the residual monomer content is contacted with an aqueous solution of the compound that can react with the monomer's double bond and simultaneously or subsequently partly or completely dried at 60° to 130° C. and preferably at 80° to 120° C. under vacuum or at atmospheric pressure.

In this method either the powdered and partly or completely dry polymer is preferably placed in the aqueous solution of the compound that can react with the monomer's double bond, while optionally being stirred, or the aqueous solution is sprayed over the powdered polymer or poured over it and mixed into it.

The compound that can react with the monomer's double bond in either embodiment of the invention can be a compound, such as for example ammonia, an ammonium salt such as hydrogen carbonate, a sulfate, a hydrogen sulfate, or a chloride, an alkylamine and/or one of its salts such as a chloride or a hydrogen sulfate, a hydroxylamine and/or its salts such as a hydrochloride or a sulfate, a hydrazine and/or it salts, a compound, such as a hydrogen halide, an acetoacetate, or a monomalonate or dimalonate, that contains an active hydrogen atom, or a compound, such as bromosuccinimide, pyridinium bromide, or dioxane perbromide, that contains bromine and allows bromine to attach to the double bond, or with a compound, such as a permanganate, a bichromate, a chromate, selenium dioxide, or ozone, that can oxidize the double bond and that can react with the residual monomers. Ozone has been demonstrated to be especially preferable.

Compounds, such as alkali sulfites, alkali hydrogen sulfites or disulfites, and thio compounds, that contain sulphur and have a reducing action are also appropriate for the second embodiment.

The in-themselves known addition reactions of the aforesaid compounds with respect to the double bond lead, subject to the usual conditions of chemical reaction (usually in solution), to a conversion of 75 to 95%. It was accordingly unexpected and surprising to discover that such reactions will also lead, at a concentration of less than 2.0 or 0.2% by weight, to a reasonable conversion, especially when the reaction components are incorporated into the solid polymer. In the swollen state the concentration of the residual monomer drops even further in accordance with the level of swelling, so that the concentration of residual monomer will be even lower than that of the reaction constituents.

With polymers that are water-soluble or swell in water to a considerable extent the level of swelling can be definitely controlled by adding polar organic solvents, such as for example alcohols, preferably methanol, ethanol, or isopropanol, or ketones, preferably acetone or methyl ethyl ketone, or tetrahydrofuran, dioxane, glycerol, or glycols, that can be mixed with water as disclosed in German Patent No. 3 141 098.

Adding the various materials resulted, depending on how much was added, in an up to 10-fold decrease in the residual monomer content in terms of the original concentration of residual monomers directly after preparation. The compounds that can react with the monomer's double bond are employed in amounts of 0.1 to 10, preferably 0.2 to 5, and particularly 0.12 to 2% by weight in terms of the water-free polymer.

The method in accordance with the invention primarily relates to the polymerization of acrylic acid and methacrylic acid in the form of a homopolymer or copolymer, whereby water-soluble monomers such as acrylamide, methacrylonitrile and acrylonitrile, vinyl pyridine, vinyl acetate, and other water-soluble monomers such as polymerizable acids and their salts, especially maleic, fumaric, itaconic, vinylsulfonic, or acrylamidopropanesulfonic acid as well as the esters of polymerizable acids that contain hydroxy groups, especially the hydroxyethyl and hydroxypropyl esters of acrylic and methacrylic acid can be employed as copolymers along with the esters and amides of polymerizable acids that contain amino groups such as the dialkylaminoesters, especially the dimethyl and diethylaminoalkyl esters of acrylic and methacrylic acid and the trimethyl- and triethylammoniumalkyl esters and corresponding amides. Furthermore, slight proportions of crosslinking monomers, such as for example monomers with more than one polymerizable group in the molecule, can be polymerized.

Small amounts of water-insoluble monomers, such as the esters of acrylic and/or methacrylic acid with $C_1$—to $C_{10}$ alcohols, styrene and alkylated styrenes can also be copolymerized. Generally the proportion of water-soluble monomers is 40 to 100% by weight of all the monomers. The proportion of crosslinking copolymers is 0 to 20 and preferably 0.01 to 2.0% by weight of all the monomers. The water-insoluble (hydrophobic) monomers usually account for 0 to 40% by weight of the monomers.

The particles of polymer range in size from 0.3 to 2.5 mm. Large pieces of polymer gel several centimeters long, wide, and high can even be processed with ozone.

DETAILED DESCRIPTION OF THE INVENTION

The invention will now be specified with reference to the following examples.

EXAMPLE 1

Preparing a crosslinked synthetic polymer 328 g of acrylic acid and 2.6 g of N,N'-methylene bisacrylamide were dissolved in 980 g of water in a polymerization vessel and adjusted to a pH of 4.0 with 127 g of sodium hydrogen carbonate. The constituents of the catalyst system (0.36 g of azo-bisamidinepropane dihydrochloride, 0.73 g of potassium persulfate, 1.34 g of sodium pyrosulfite, and 0.06 g of iron(II) gluconate), dissolved in 120 ml of water were added at room temperature, initiating adiabatic polymerization. The resulting gel was reduced in size, sprayed with an aqueous solution of $NH_2OH$—HCl and dried at 100° to 110° C. The results are set forth in Table 1.

TABLE 1

Residual monomer content in the end product in the treatment of the polymer gel with an aqueous solution of $NH_2OH.HCl$

| Additive % by weight | Polymer gel | |
|---|---|---|
| | Laboratory scale residual monomers % by weight | Industrial scale residual monomers % by weight |
| 0.0 | 0.22 | 0.42 |
| 0.2 | — | 0.078 |
| 0.5 | 0.091 | 0.067 |
| 1.0 | — | 0.034 |
| 1.5 | 0.035 | — |
| 2.0 | — | <0.010 |

The aforesaid batch was increased 100 times on the industrial scale.

EXAMPLE 2

Preparing a crosslinked synthetic copolymers 320 g of acrylic acid and 3.75 g of N,N'-methylene bisacrylamide were dissolved in 862 g of water in a polymerization vessel and adjusted to a pH of 4.4 with 100 g of sodium hydrogen carbonate. The constituents of the catalyst system (0.6 g of azo-bisamidinepropane dihydrochloride, 0.6 g of potassium persulfate, and 1.2 g of sodium pyrosulfite), dissolved in 150 g of water were added at room temperature, initiating practically adiabatic polymerization. The resulting polymer gel was cut up, dried, and ground. The residual monomer content was 0.3% by weight. The polymer (20 g) was mixed with the aqueous solution of the additives and dried at 120° C. Table 2 lists the additives and illustrates the results.

TABLE 2

| Additive (% by weight) | Amount of water in terms of polymer (% by weight) | Residual monomer content (% by weight) |
|---|---|---|
| Starting product | — | 0.30 |
| $NH_2OH \cdot HCl$, 1.0 | 300 | 0.0040 |
| $NH_2OH \cdot HCl$, 1.0 | 50 | 0.0080 |

The amounts of starting material and water are in percent by weight of the water-free polymer.

EXAMPLE 3

A polymer was prepared as described in Example 2 except that the polymerization was carried out at a pH of 5.6. The dried and ground product had a residual monomer content of 0.21% by weight. The polymer (40 g) was mixed with an aqueous solution of the additive and dried at 120° C. Table 3 lists the amounts of additive and water employed in percent by weight of the water-free starting material.

TABLE 3

| Additive (% by weight) | Amount of water in terms of polymer (% by weight) | Residual monomer content (% by weight) |
|---|---|---|
| Starting product | — | 0.210 |
| t-butylamine, 5.0 | 150 | 0.067 |
| Methyl acetoacetate, 5.0 | 150 | 0.081 |
| Diethyl malonate, 5.0 | 150 | 0.13 |
| Mercury (II) acetate, 5.0 | 150 | 0.035 |
| Ammonium hydrogen carbonate, 2.0 | 500 | 0.033 |
| Ammonium hydrogen carbonate, 5.0 | 500 | 0.026 |

EXAMPLE 4

The polymer prepared as described in Example 2, not completely dried (8.5% by weight of water), ground, and with a residual monomer content or 0.3% by weight, was mixed with the aqueous solution of sodium disulfite and dried at 120° C. subject to the conditions described in Example 2. Table 4 shows the results.

TABLE 4

| Additive (% by weight) | Amount of water in terms of polymer (% by weight) | Residual monomer content (% by weight) |
|---|---|---|
| Starting product | — | — |
| $Na_2S_2O_5$, 1.0 | 300 | 0.0160 |
| $Na_2S_2O_5$, 1.0 | 150 | 0.0043 |
| $Na_2S_2O_5$, 1.0 | 50 | 0.0041 |
| $Na_2S_2O_5$, 3.0 | 50 | 0.0080 |
| $Na_2S_2O_5$, 5.0 | 300 | 0.0030 |
| $Na_2S_2O_5$, 5.0 | 50 | 0.0040 |

The amounts of sodium disulfite and water employed are in percent by weight in terms of the water-free polymer.

EXAMPLE 5

Reference

The polymer prepared as described in Example 1 was cut up, sprayed with an aqueous solution of sodium disulfite as described in U.S. Pat. No. 3,755,280, and dried at 100° to 110° C. The polymer was prepared both in the laboratory and on an industrial scale as described in Example 1.

TABLE 5

| Additive % by weight | Polymer gel Laboratory scale residual monomers % by weight | Industrial scale residual monomers % by weight |
|---|---|---|
| 0.0 | 0.22 | 0.42 |
| 0.5 | 0.15 | 0.21 |
| 1.0 | 0.13 | 0.15 |
| 1.5 | 0.075 | 0.078 |
| 3.0 | — | 0.013 |

EXAMPLE 6

The polymer prepared and dried as described in Example 1 and with a residual monomer content of 0.42% by weight (acrylic acid) was sprinkled into an ethanolic aqueous solution of hydroxylamine hydrochloride and dried at 110° C. Table 6 summarizes the results and the ratios of ethanol to water.

TABLE 6

| $NH_2OH \cdot HCl$ % by weight | Water % by weight | Ethanol % by weight | Residual monomers % by weight |
|---|---|---|---|
| 1.0 | 90 | 10 | 0.04 |
| 1.0 | 75 | 25 | 0.05 |
| 1.0 | 50 | 50 | 0.14 |
| Starting product | — | — | 4.2 |

The amounts of hydroxylamine, water, and ethanol employed are in terms of the water-free polymer.

The same polymer was sprinkled into an aqueous solution of hydroxylamine hydrochloride containing tetrahydrofuran (90 $H_2O$:10 THF) and dried. A residual monomer content of 0.045% by weight was obtained.

EXAMPLE 7

A low molecular-weight copolymer of 85:15 acrylic acid and acrylamide was prepared in the form of a 40% aqueous solution by redox polymer polymerization. Upon termination of polymerization the residual monomer content in the aqueous polymer solution was 0.39% acrylic acid and 0.06% acrylamide by weight. 3.0 g of solid hydroxylammonium hydrochloride (0.5% by weight of hydrochloride in terms of the copolymer) was added to the polymer solution at a temperature of 90° C. and reflux cooled at 90° to 95° C. for 2 hours. The residual monomer content decreased to 0.15% acrylic acid and 0.02% acrylamide by weight.

EXAMPLE 8

A high molecular-weight water-soluble copolymer of 85 mol % acrylamide and 15 mol % acrylic acid has a residual monomer content of 0.23% by weight of acrylamide and 0.01% by weight of acrylic acid. The product (40 g) was mixed with 60 ml of an aqueous solution of various additives and dried at 100° C. Table 8 shows the results.

TABLE 8

| Additive | wt % | Water wt % | Residual monomer wt % | wt % |
|---|---|---|---|---|
| Ammonium sulfate | 5 | 150 | 0.11 | 0.010 |
| Ammonium nitrate | 5 | 150 | 0.14 | 0.010 |
| Hydrazine sulfate | 5 | 150 | 0.012 | 0.010 |

TABLE 8-continued

| Additive | Water wt % | wt % | Residual monomer wt % | wt % |
|---|---|---|---|---|
| 1,3-Propylene diamine | 5 | 150 | 0.010 | 0.010 |
| Ethanolamine | 5 | 150 | 0.10 | 0.010 |
| Diisopropylamine | 5 | 150 | 0.21 | 0.010 |
| Hydrogen bromide (47% in water) | 2.0 | 150 | 0.008 | 0.010 |
| Hydrogen iodide (57% in water) | 2.0 | 150 | 0.20 | 0.012 |
| Bromosuccinimide | 0.5 | 150 | 0.16 | 0.012 |
| Potassium permanganate | 0.5 | 150 | 0.064 | 0.012 |
| Starting product | | | 0.23 | 0.012 |

The amounts of additive and water added are in terms of the water-free copolymer of acrylamide and acrylic acid.

EXAMPLE 9

A high molecular-weight copolymer of 75 mol % acrylamide and 25 mol % acrylic acid was dried and exhibited a residual monomer content of 0.10% by weight of acrylamide and 0.40% by weight acrylic acid (Sample 1)

The aqueous polymer gel was treated with a mixture of gases that included ozone subject to various conditions (Samples 2 to 4), resulting in a definite decrease in the residual monomer content (see Table 9).

TABLE 9

| Sample | Ozone concentration % by volume | Time minutes | Residual monomer content Amide | Acid |
|---|---|---|---|---|
| 1 | 0 | 0 | 0.1 | 0.4 |
| 2 | 8 | 10 | 0.013 | 0.036 |
| 3 | 1 | 10 | 0.015 | 0.048 |
| 4 | 1 | 5 | 0.024 | 0.088 |

EXAMPLE 10

A readily crosslinking partly neutralized acrylic acid polymer (with up to 70% sodium salt) has a residual monomer content of 0.08% by weight after drying.

The aqueous polymer gel was treated at 40° C. with a mixture of gases containing ozone (8% by volume). The residual monomer content decreased to 0.012% by weight in 5 minutes and to 0.004% by weight in 10 minutes.

EXAMPLE 11

A high molecular-weight acrylamide homopolymer in the form of an aqueous polymer gel with a residual monomer content of 0.10% by weight was treated for 10 minutes with a mixture of gases containing 8% by volume of ozone or for 5 minutes with a mixture containing 1% by volume of ozone at 35° C., decreasing the residual monomer content to 0.01% by weight in the former case and to 0.02% by weight in the latter.

EXAMPLE 12

A high molecular-weight copolymer of 55% by weight of acrylamide and 45% by weight of dimethylaminopropylacrylamide had a residual monomer content of 0.20% by weight of acrylamide after drying (Sample 1).

The aqueous polymer gel was treated before being dried with a mixture of gases containing 8 or 1% by weight (Samples 2 and 3), considerably decreasing the residual monomer content (see Table 12).

TABLE 12

| Sample | Ozone % by vol. | Time minutes | Residual monomer content percent by weight Acrylamide | DIMAPA quat. |
|---|---|---|---|---|
| 1 | 0 | 0 | 0.20 | — |
| 2 | 8 | 10 | 0.048 | — |
| 3 | 1 | 5 | 0.125 | — |

EXAMPLE 13

A crosslinked partly neutralized acrylic-acid polymer in the form of a gel containing 64% by weight of water and up to 70% sodium salt was briefly treated with mixtures of ozone (8 and 1% by volume) at 40° and 45° C. respectively. It was dried and the residual monomer content determined. The following table represents the test conditions and results.

TABLE 13

| Sample | Ozone treatment Concentration % by volume | Time minutes | Residual monomer content % by weight |
|---|---|---|---|
| 1 | 0 | 0 | 0.546 |
| 2 | 8 | 10 | 0.015 |
| 3 | 1 | 5 | 0.049 |
| 4 | 8 | 10 | 0.168 |

Sample 1 was a reference and was not treated with ozone but only dried subject to the same conditions. Samples 2 and 3 were chopped up polymer gels (particle size of 0.2 to 1.0 cm) and Sample 4 was a solid piece of polymer gel measuring 10×4 cm. These were treated with ozone.

What is claimed is:

1. In the treatment of a homopolymer or copolymer based on at least one of acrylic acid and acrylamide with a compound that can react with the double bond of residual monomer contained therein which homopolymer or copolymer is water-soluble or swells up in water and has a low residual monomer content, the improvement which comprises effecting such treatment with hydroxylamine or a salt thereof acting on the homopolymer or copolymer in swollen form and in the form of a gel.

2. A method according to claim 1, wherein the hydroxylamine or salt thereof is employed either as a solid or dissolved.

3. A method according to claim 1, wherein a polymer gel contains 20 to 90% by weight of water.

4. A method according to claim 1, wherein a polymer gel contains 50 to 75% by weight of water.

5. A method according to claim 3, wherein the hydroxylamine or salt thereof is applied or sprayed onto the polymer gel and the gel is thereafter dried at least in part at an elevated temperature.

6. A method according to claim 1, wherein the homopolymer or copolymer is treated at a temperature of 50° to 150° C. for 10 to 180 minutes, optionally under vacuum.

7. A method according to claim 1, wherein the homopolymer or copolymer is treated at a temperature of 80° to 120° C. for 20 to 120 minutes, optionally under vacuum.

8. In the treatment of a homopolymer or copolymer based on at least one of acrylic acid and acrylamide with a compound that can react with the double bond of residual monomer contained therein with homopolymer or copolymer is water-soluble or swells up in water and has a low residual monomer content, the improvement which comprises effecting such treatment with a solution of hydroxylamine or a salt thereof acting on the homopolymer or copolymer in powdered and partly or completely dried form, and then drying the resulting polymer gel at elevated temperature.

9. A method according to claim 8, wherein either the powdered polymer is added to the solution of the hydroxylamine or its salt, optionally while being stirred, or the hydroxylamine or salt thereof is sprayed onto or poured over the powdered polymer.

10. A method according to claim 1 or 8, wherein water alone or a mixture of water with a polar organic solvent is used as a swelling agent or solvent for the polymer and hydroxylamine or salt thereof.

11. A method according to claim 10, wherein the swelling agent or solvent that contains an organic solvent contains at least 10% by weight of water.

12. A method according to claim 10, wherein the swelling agent or solvent that contains an organic solvent contains at least 25% by weight of water.

13. A method according to claim 1, wherein the swelling agent or solvent that contains an organic solvent contains at least 50% by weight of water.

* * * * *